United States Patent
Huber et al.

(10) Patent No.: US 7,431,573 B2
(45) Date of Patent: Oct. 7, 2008

(54) DEVICE FOR GENERATING A REDUCING AGENT/AIR MIXTURE

(75) Inventors: Sven Huber, Ainring (DE); Hanspeter Mayer, Adnet (AT)

(73) Assignee: Robert Bosch GmbH, Stuttgart (DE)

( * ) Notice: Subject to any disclaimer, the term of this patent is extended or adjusted under 35 U.S.C. 154(b) by 650 days.

(21) Appl. No.: 10/381,849

(22) PCT Filed: Sep. 27, 2001

(86) PCT No.: PCT/DE01/03712

§ 371 (c)(1),
(2), (4) Date: Feb. 11, 2004

(87) PCT Pub. No.: WO02/27160

PCT Pub. Date: Apr. 4, 2002

(65) Prior Publication Data

US 2004/0115074 A1    Jun. 17, 2004

(30) Foreign Application Priority Data

Sep. 29, 2000    (DE) .............................. 100 48 246

(51) Int. Cl.
*F04B 17/00*    (2006.01)
*F04B 35/04*    (2006.01)
*F04B 43/06*    (2006.01)

(52) U.S. Cl. ................. 417/410.3; 417/395; 417/413.1; 137/853

(58) Field of Classification Search ................. 417/395, 417/410.3, 410.4, 413.1; 137/853
See application file for complete search history.

(56) References Cited

U.S. PATENT DOCUMENTS

| | | | |
|---|---|---|---|
| 2,270,737 A | | 1/1942 | Landon |
| 2,948,297 A | * | 8/1960 | Langdon ...................... 137/846 |
| 3,765,802 A | * | 10/1973 | Leitermann et al. ......... 417/395 |
| 5,131,816 A | * | 7/1992 | Brown et al. .................... 417/2 |

* cited by examiner

*Primary Examiner*—Devon Kramer
*Assistant Examiner*—Patrick Hamo
(74) *Attorney, Agent, or Firm*—Ronald E. Greigg

(57) ABSTRACT

The apparatus for generating a mixture of reducing agent and air has a pumping agent feed pump having a pump housing and a mixing chamber into which reducing agent and air pumped by the feed pump can be introduced; the mixing chamber is embodied in a mixing chamber body which communicates directly with the pump housing of the feed pump and forms a cap of the pump housing. The feed pump has a drive shaft which protrudes into the pump housing, and the mixing chamber body is disposed at least approximately radially to the drive shaft The apparatus has a compact structural size and only a slight reducing agent-filled idle volume.

15 Claims, 2 Drawing Sheets

DEVICE FOR GENERATING A REDUCING AGENT/AIR MIXTURE

CROSS-REFERENCE TO RELATED APPLICATIONS

This application is a 35 USC 371 application of PCT/DE 01/03712 filed on Sept. 27, 2001.

BACKGROUND OF THE INVENTION

1. Field of the Invention

The invention is directed to an improved apparatus for generating a mixture of reducing agent and air.

2. Description of the Prior Art

One apparatus of this type with which this invention is concerned is known from the literature: *Dieselmotor-Management* [Diesel Engine Management], Vieweg Verlag, 2nd Edition, 1998, page 31. This apparatus is part of a system for posttreatment of exhaust gases of internal combustion engines, especially self-igniting internal combustion engines. By adding a reducing agent to the exhaust gas, the effectiveness of a reducing catalytic converter for reducing nitrogen oxides in the exhaust gas can be improved. The apparatus has a feed pump, by which reducing agent is pumped and which has a pump housing. The apparatus has also a mixing chamber, into which reducing agent and air pumped by the feed pump can be introduced, in order to create the mixture of reducing agent and air. The mixing chamber is embodied in a mixing chamber body, which is disposed separately from the feed pump. As a result, the apparatus has a large structural size, and a connecting line is necessary between the feed pump and the mixing chamber, which makes production and assembly of the apparatus complicated and expensive, and there is the risk of leaks at the connections of these elements. The known apparatus furthermore has a large idle volume filled with the reducing agent, which adversely affects the dynamics of the apparatus when there are changes in the required quantity of the mixture of reducing agent and air.

SUMMARY OF THE INVENTION

The apparatus of the invention has the advantage over the prior art of having a smaller structural size. The production and assembly of the apparatus are also simplified, since there is no need for a long connecting line between the feed pump and the mixing chamber. Finally, because the mixing chamber body is disposed directly on the pump housing, the reducing agent-filled idle volume of the apparatus is reduced, thus improving the dynamics of the apparatus. Also because of the reduced idle volume, less energy is required for thawing out the reducing agent, or preventing it from freezing.

Advantageous features and refinements of the apparatus of the invention are disclosed. One embodiment makes a simple structure of the apparatus possible. A short structural length of the apparatus in the direction of the shaft of the drive motor may be achieved and a reverse flow of the mixture of reducing agent and air into the feed pump may be avoided. A uniform mixing of the mixture of reducing agent and air are possible. A particularly simple check valve is possible.

BRIEF DESCRIPTION OF THE DRAWINGS

Other features and advantages of the invention will become apparent from the detailed description contained herein below, taken in conjunction with the drawings, in which.

DESCRIPTION OF THE PREFERRED EMBODIMENT

Figure 1:
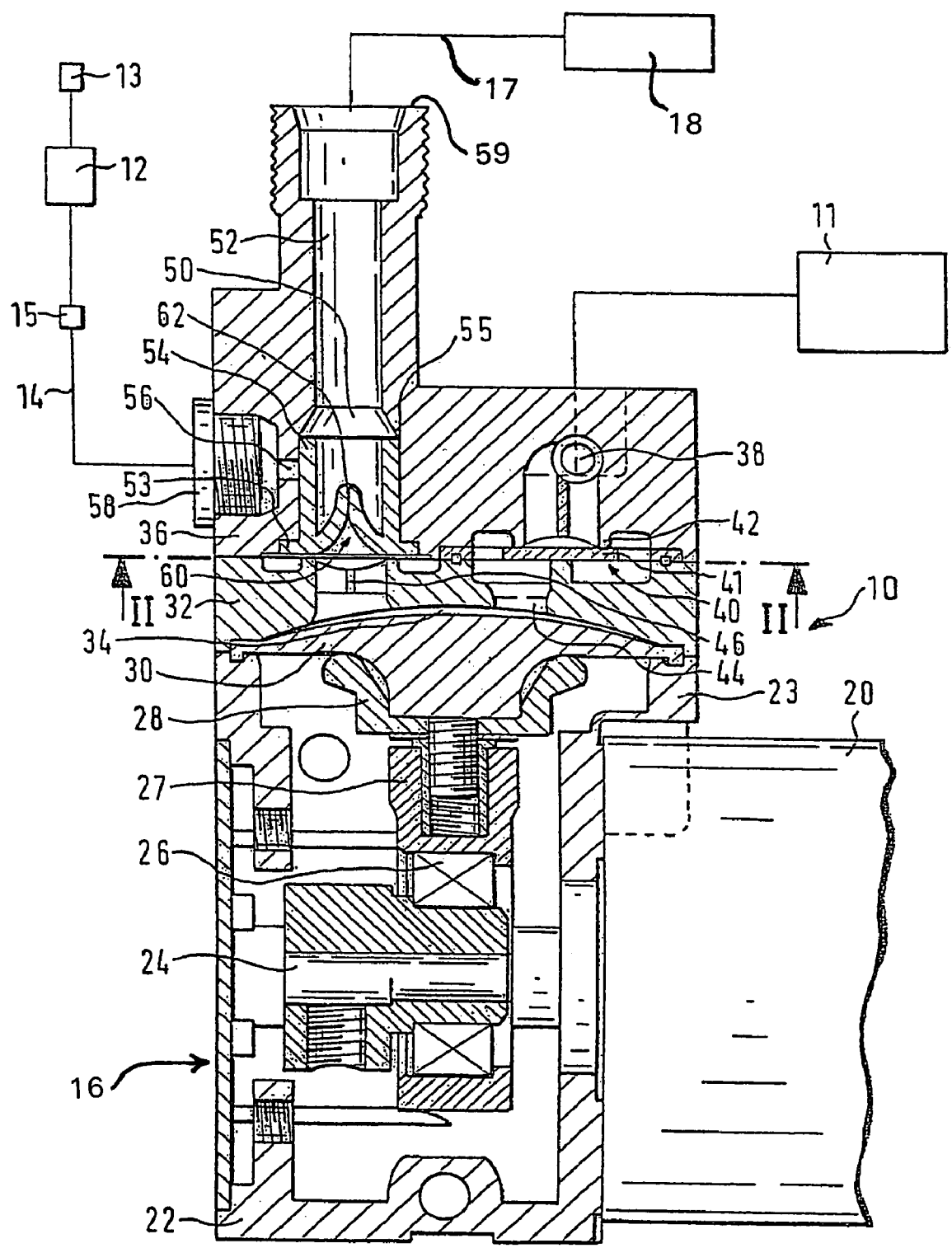
FIG. 1 shows an apparatus for creating a mixture of reducing agent and air in a longitudinal section.
Figure 2:
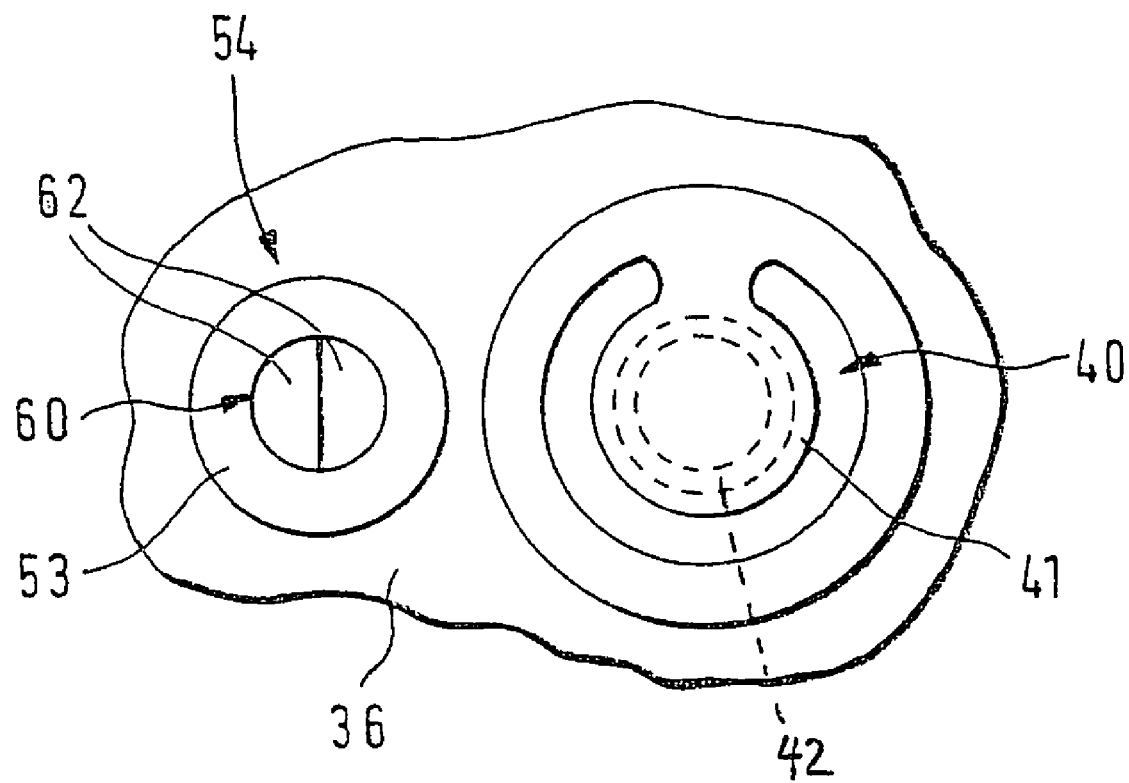
FIG. 2 shows the apparatus in a cross section taken along the line II-II in FIG. 1.

FIGS. 1 and 2 show an apparatus 10 for creating a mixture of reducing agent and air, which apparatus is a component of a system for posttreatment of exhaust gas of a self-igniting internal combustion engine. The system has a container 11 for reducing agent, which can preferably be an aqueous urea solution or some other solution containing ammonia. The system furthermore has a compressed-air reservoir 12, into which air is pumped by a compressor 13 and in which pressure is generated. From the compressed-air reservoir 12, via a line 14, for instance in the form of a hose or in some other form for whose control a valve 15 is provided, compressed air is delivered to the apparatus 10. The apparatus 10 has a feed pump 16, by which reducing agent is pumped out of the container 11; in the apparatus 10, as will be described in further detail hereinafter, the reducing agent is mixed with the supplied compressed air, creating the mixture of reducing agent and air and optionally a wall film of the reducing agent. Via a line 17, the mixture of reducing agent and air that has been created is delivered to a reducing catalytic converter 18.

The feed pump 16 of the apparatus 10 has an electric drive motor 20, which is preferably embodied as a stepping motor. When a stepping motor 20 is used, each step with which the stepping motor is operated corresponds to a defined pumping quantity of the feed pump 16, so that by operating the stepping motor 20 at a defined number of steps, a predetermined quantity of reducing agent is pumped by the feed pump 16. The operation of the stepping motor 20 is controlled by a control unit, not shown, so that by means of the feed pump 16, the quantity of reducing agent required in a given operating state of the engine will be pumped.

The feed pump 16 has a pump housing, with a housing part 22 to which the drive motor 20 is connected. The drive motor 20 has a shaft 24, which protrudes into the housing part 22 and with which, via an eccentric bearing 26, an eccentric tappet 27 is coupled, that does not rotate with the shaft 24 but instead is disposed in a manner fixed against relative rotation, yet movably radially to the shaft 24 in the housing part 22. Upon a rotary motion of the shaft 24, the eccentric tappet 27 is driven by the eccentric bearing 26 into a reciprocating motion, which it transmits via a support 28 to a diaphragm 30 acting as a feed element of the feed pump 16. The diaphragm 30 is fastened at its edge between a flange region 23 of the housing part 22 and an intermediate plate 32, joined to it and also forming part of the pump housing. The diaphragm 30, the flange 23 of the housing part 22, and the intermediate plate 32 are for instance embodied with a rounded cross section. Between the diaphragm 30 and the intermediate plate 32, a work chamber 34 of the feed pump 16 is defined. The intermediate plate 32 is disposed approximately radially to the shaft 24 of the drive motor 20.

As a further part of the pump housing, a mixing chamber body 36 adjoins the intermediate plate 32; it is connected, for instance by screws, to the intermediate plate 32 and/or to the housing part 22, and it forms a cap part of the pump housing. The mixing chamber body 36 is disposed approximately radially to the shaft 24 of the drive motor 20 and in cross section is for instance embodied in rounded form, corresponding to the intermediate plate 32. A connection stub 38 for a line leading to the container 11 is disposed on the outer jacket of the mixing chamber body 36 and discharges into the work chamber 34. A check valve 40 opening into the work chamber 34 is disposed between the connection stub 38 and the work chamber 34. The check valve 40 is embodied as a diaphragm valve, whose diaphragm is fastened at its edge between the intermediate plate 32 and the mixing chamber body 36 and has a partly cut-away middle region 41 that forms a movable valve member that cooperates with the face end of a stub 42 embodied on the mixing chamber body 36 to form a valve seat into which the connection stub 38 discharges. When the check valve 40 is closed, its valve member 41 comes to rest on the face end of the stub 42, closing it, so that in the pumping stroke of the diaphragm 30, no reducing agent can flow out of the work chamber 34 back into the container 11 via the connection stub 38. In the intake stroke of the diaphragm 30, the check valve 40 is open, and its valve member 41 lifts from the face end of the stub 42, so that reducing agent can flow into the work chamber 34. An inlet opening 44 for the reducing agent flowing into the work chamber 34 is embodied in the intermediate plate 32.

Also embodied in the intermediate plate 32 is an outlet opening 46 for the reducing agent that is positively displaced by the feed pump 16 in the pumping stroke of the diaphragm 30. The outlet opening 46 discharges into a mixing chamber 50, which is embodied in the mixing chamber body 36 and in which the pumped reducing agent is mixed with air. The mixing chamber body 36 has a bore 52, which is disposed approximately coaxially to the outlet opening 46 of the intermediate plate 32 and which in the direction away from the intermediate plate 32, in an approximately conical transition region, decreases in diameter; the mixing chamber 50 is embodied in this transitional region. An elastically compressible sleeve 54 is pressed into the portion of the bore, toward the intermediate plate 32, that has the larger diameter. The sleeve 54 can preferably comprise rubber or an elastic plastic. In the uncompressed state, the sleeve 54 rests tightly against the circumference of the bore 52. A compressed-air inlet bore 56 discharges in the region of the sleeve 54 at the circumference of the bore 52 and communicates with a compressed-air connection stub 58, which is disposed on the outer jacket of the mixing chamber body 36 and to which the line 14 leading from the compressed-air reservoir 12 is connected.

The bore 52 continues, in its portion of smaller diameter at the mixing chamber body 36, in the form of a stub 59 formed integrally onto the mixing chamber body. Between the mixing chamber 50 and the work chamber 34 of the feed pump 16, a check valve 60 opening into the mixing chamber 50 is disposed, which prevents an aspiration from the mixing chamber 50 from occurring in the intake stroke of the feed pump 16. The check valve 60 is preferably embodied as a so-called duckbill valve and has two or more lips 62, which are elastically deformable and are formed integrally onto the sleeve 54 and protrude inward from it. On their ends toward the intermediate plate 32, the lips 62 are formed onto the sleeve 54, and they extend away from the intermediate plate 32 inward into the sleeve 54. With their free ends, the lips 62 rest tightly against one another and close the sleeve 54. In the pumping stroke of the feed pump 16, the lips 62 are moved radially apart from one another by the pressure exerted on them, so that they open a passage through the sleeve 54, and reducing agent from the work chamber 34 can pass through the sleeve 54 to reach the mixing chamber 50. In the closed state, when the lips 62 rest tightly against one another, the check valve 60 prevents an inflow of compressed air from the mixing chamber 50 into the work chamber 34 of the feed pump 16, since the pressure in the mixing chamber 50 closes the check valve 60. The portion of the sleeve 54 located in the bore 52 forms a check valve, by which the compressed-air inlet bore 56 is closed, if no compressed air is supplied, and thus reducing agent is prevented from penetrating the compressed-air inlet bore 56. The sleeve 54, on its end toward the intermediate plate 32, has a flange 53 of increased diameter, which is fixed between the intermediate plate 32 and the mixing chamber body 36, preventing the sleeve 54 in the bore 52 from being displaced in the direction of its longitudinal axis. The lips 62 of the check valve 60 rest on one another with initial tension and thereby prevent liquid reducing agent from continuing to dribble out.

For creating the mixture of reducing agent and air, the feed pump 16 is driven by the drive motor 20 in such a way that it pumps the requisite quantity of reducing agent, which reaches the mixing chamber 50. Moreover, via the compressed-air inlet, compressed air is supplied, and the sleeve 54 is elastically compressed by the compressed air so that between it and the bore 52, an annular gap 55 is created, through which the compressed air can reach the mixing chamber 50. In the mixing chamber 50, the most uniform possible mixing of the reducing agent with the compressed air takes place, and the resultant mixture of reducing agent and air gets into the stub 59 of the mixing chamber body 36. The line 17, by way of which the mixture of reducing agent and air created is delivered to the reducing catalytic converter 18, is connected to the stub 59.

The apparatus 10 has only a slight idle volume that is filled with reducing agent after the termination of operation of the feed pump 16. The idle volume comprises the volume of the work chamber 34, the volume defined in the intermediate plate 32 by the inlet opening 44 and the outlet opening 46, and the volume defined between the intermediate plate 32 and the mixing chamber body 36. Because this idle volume is only slight, the apparatus 10 has good dynamics when varying quantities of mixture of reducing agent and air are required. After the termination of operation of the feed pump 16, compressed air continues to be delivered to the mixing chamber 50, preferably for a predetermined length of time, in order to remove residues of reducing agent that could dry there and impair the further function of the apparatus 10. Because the mixing chamber body 36 is disposed directly on the pump housing, the apparatus 10 has a compact structure, and because of the radial disposition of the mixing chamber body 36, the structural length of the apparatus 10 in the direction of the shaft 24 of the drive motor 20 is not increased. After being assembled, the apparatus 10 can already be checked as to its function, so that a malfunction can be detected early and corrected.

The foregoing relates to preferred exemplary embodiments of the invention, it being understood that other variants and embodiments thereof are possible within the spirit and scope of the invention, the latter being defined by the appended claims.

We claim:

1. An apparatus for generating a mixture of reducing agent and air, comprising a feed pump (16) by which reducing agent is pumped and which has a pump housing (22, 32), and a mixing chamber (50), in which reducing agent and air pumped by the feed pump (16) can be introduced, the mixing chamber (50) being embodied in a mixing chamber body (36), the mixing chamber body (36) communicating with the pump housing (22, 32) of the feed pump (16), wherein the mixing chamber (50) is embodied in a bore (52) of the mixing chamber body (36); wherein an elastically compressible sleeve (54) is pressed into the bore (52); and wherein an air inlet (56) discharges into the bore (52) at the circumference of the sleeve (54), the sleeve (54) being elastically compressible by the air, supplied under pressure, so that air can reach the mixing chamber (50) through an annular gap (55) forming between the bore (52) and the sleeve (54).

2. The apparatus of claim 1, wherein the mixing chamber body (36) forms a cap of the pump housing (22, 32).

3. The apparatus of claim 1, wherein the feed pump (16) comprises a drive shaft (24) for a feed element (30), which shaft protrudes into the pump housing (22)

the mixing chamber body (36) being disposed at least approximately radially to the drive shaft (24).

4. The apparatus of claim 2, wherein the feed pump (16) comprises a drive shaft (24) for a feed element (30), which shaft protrudes into the pump housing (22)

the mixing chamber body (36) being disposed at least approximately radially to the drive shaft (24).

5. The apparatus of claim 1, further comprising a reducing-agent supply stub (38) disposed on the mixing chamber body (36); and a check valve (40) disposed between the reducing-agent supply stub and a work chamber (34) of the feed pump (16) and opening into the work chamber (34).

6. The apparatus of claim 2, further comprising a reducing-agent supply stub (38) disposed on the mixing chamber body (36); and a check valve (40) disposed between the reducing-agent supply stub and a work chamber (34) of the feed pump (16) and opening into the work chamber (34).

7. The apparatus of claim 3, further comprising a reducing-agent supply stub (38) disposed on the mixing chamber body (36); and a check valve (40) disposed between the reducing-agent supply stub and a work chamber (34) of the feed pump (16) and opening into the work chamber (34).

8. The apparatus of claim 5, further comprising a check valve (60) disposed between an outlet (46) of the feed pump (16) and the mixing chamber (50) and opening into the mixing chamber (50).

9. The apparatus of claim 6, further comprising a check valve (60) disposed between an outlet (46) of the feed pump (16) and the mixing chamber (50) and opening into the mixing chamber (50).

10. The apparatus of claim 7, further comprising a check valve (60) disposed between an outlet (46) of the feed pump (16) and the mixing chamber (50) and opening into the mixing chamber (50).

11. The apparatus of claim 1, further comprising a check valve (60) disposed between an outlet (46) of the feed pump (16) and the mixing chamber (50) and opening into the mixing chamber (50), the check valve (60) being embodied integrally with the sleeve (54), in the form of lips (62) protruding inward from the sleeve that rest sealingly on one another and that can be moved away from one another, for opening a passage, under the influence of the feed pressure generated by the feed pump (16).

12. The apparatus of claim 5, further comprising a check valve (60) disposed between an outlet (46) of the feed pump (16) and the mixing chamber (50) and opening into the mixing chamber (50), the check valve (60) being embodied integrally with the sleeve (54), in the form of lips (62) protruding inward from the sleeve that rest sealingly on one another and that can be moved away from one another, for opening a passage, under the influence of the feed pressure generated by the feed pump (16).

13. The apparatus of claim 1, further comprising a stub (59) leading away from the mixing chamber (50), the stub (59) being formed integrally onto the mixing chamber body (36), the generated mixture of reducing agent and air emerging through this stub (59).

14. The apparatus of claim 2, further comprising a stub (59) leading away from the mixing chamber (50), the stub (59) being formed integrally onto the mixing chamber body (36), the generated mixture of reducing agent and air emerging through this stub (59).

15. The apparatus of claim 1, wherein the feed pump (16) comprises an electric drive motor (20) embodied as a stepping motor.

\* \* \* \* \*